US009137098B2

(12) United States Patent
Chen et al.

(10) Patent No.: US 9,137,098 B2
(45) Date of Patent: Sep. 15, 2015

(54) T-STAR INTERCONNECTION NETWORK TOPOLOGY

(75) Inventors: Dong Chen, Croton on Hudson, NY (US); Paul W. Coteus, Yorktown, NY (US); Noel A. Eisley, Wappinger Falls, NY (US); Philip Heidelberger, Cortlandt Manor, NY (US); Robert M. Senger, Tarrytown, NY (US); Yutaka Sugawara, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 13/584,300

(22) Filed: Aug. 13, 2012

(65) Prior Publication Data

US 2014/0044015 A1     Feb. 13, 2014

Related U.S. Application Data

(63) Continuation of application No. 13/569,789, filed on Aug. 8, 2012.

(51) Int. Cl.
*H04L 12/715*     (2013.01)
*H04L 12/24*     (2006.01)

(52) U.S. Cl.
CPC ............ *H04L 41/0663* (2013.01); *H04L 41/12* (2013.01); *H04L 41/145* (2013.01); *H04L 45/04* (2013.01)

(58) Field of Classification Search
USPC .................. 370/255, 256, 310, 407, 422, 425
See application file for complete search history.

(56) References Cited

U.S. PATENT DOCUMENTS

| 5,175,733 | A | * | 12/1992 | Nugent .......................... 370/400 |
|---|---|---|---|---|
| 5,271,014 | A | * | 12/1993 | Bruck et al. .................... 714/4.1 |
| 5,471,580 | A | * | 11/1995 | Fujiwara et al. ............... 709/249 |
| 5,983,323 | A | * | 11/1999 | Billard et al. .................. 711/130 |
| 6,101,181 | A | * | 8/2000 | Passint et al. .................. 370/352 |
| 7,305,487 | B2 | | 12/2007 | Blumrich et al. |
| 7,457,303 | B2 | | 11/2008 | Blumrich et al. |
| 2003/0212877 | A1 | * | 11/2003 | Dally et al. ...................... 712/12 |
| 2010/0246581 | A1 | * | 9/2010 | Henry et al. ................... 370/392 |
| 2011/0119399 | A1 | | 5/2011 | Chen et al. |
| 2011/0173413 | A1 | | 7/2011 | Chen et al. |
| 2011/0213946 | A1 | | 9/2011 | Ajima et al. |
| 2012/0020242 | A1 | * | 1/2012 | McLaren et al. ............... 370/254 |
| 2012/0233496 | A1 | * | 9/2012 | Gil et al. ....................... 714/4.11 |

OTHER PUBLICATIONS

V. Puente, Adaptive Bubble Router: a Design to Improve Performance in Torus Networks, 1999, IEEE, pp. 1-10.*

(Continued)

*Primary Examiner* — Michael Thier
*Assistant Examiner* — Prince A Mensah
(74) *Attorney, Agent, or Firm* — Cantor Colburn LLP

(57) ABSTRACT

According to one embodiment of the present invention, a method of constructing network communication for a grid of node groups is provided, the grid including an M dimensional grid, each node group including N nodes, wherein M is greater than or equal to one and N is greater than one, wherein each node includes a router. The method includes directly connecting each node in each node group to every other node in the node group via intra-group links and directly connecting each node in each node group of the M dimensional grid to a node in each neighboring node group in the M dimensional grid via inter-group links.

11 Claims, 4 Drawing Sheets

(56) References Cited

OTHER PUBLICATIONS

Amit Kumar, Express Virtual Channels: Towards the Ideal Interconnection Fabric, Jun. 2007, pp. 1-12.*

IBM Blue Gene Team, "Overview of the IBM Blue Gene/P project," 2008, IBM J. Res. and Dev., vol. 52, No. 1/2, January/March, p. 199-220.

Adiga, N.R., et al. "BlueGene/L Torus Interconnection Network," (2005), IBM Journal of Research and Development, vol. 49 Issue 2, p. 265-276.

Y. Ajima, et al., "The Tofu Interconnect," IEEE Micro, vol. 32, No. 1, pp. 21-31, (Jan./Feb. 2012).

R. Alverson, D. Roweth, L. Kaplan, •The Gemini System Interconnect,• 18th IEEE Symposium on High Performance Interconnects, Aug. 2010, p. 83-87.

D. Chen, et al., "The IBM Blue Gene/Q Interconnection Fabric," IEEE Micro, vol. 32, No. 1, pp. 32-43,—(Jan./Feb. 2012).

D. Chen, et al., "The IBM Blue Gene/Q Interconnection Network and Message Unit," Proc. Int•l Conf. High Performance Computing, Networking, Storage and Analysis (SC 11), ACM Press, 2011, article 26, p. 1-10.

A. Gara, M., et al. "Overview of the Blue Gene/L system architecture," IBM Journal of Research and Development, vol. 49, No. 2/3, pp. 195-212, Mar./May 2005.

Gomez et al., "An Efficient Fault-Tolerant Routing Methodology for Meshes and Tori", IEEE Computer Architecture Letters, vol. 3, 204, p. 1-4.

R.A. Haring, et al., "The IBM Blue Gene/Q Compute Chip," IEEE Micro, vol. 32, No. 2, pp. 48-60, (Mar./Apr. 2012).

C.T. Ho and L. Stockmeyer, •A New Approach to Fault-Tolerant Wormhole Routing for Mesh-Connected Parallel Computers,• Proc. 16th International Parallel and Distributed Processing Symposium, 2002, p. 427-438.

John Kim, et al., "Technology-Driven, Highly-Scalable Dragonfly Topology," Jun. 2008, ISCA '08: Proceedings of the 35th Annual International Symposium on Computer Architecture, Publisher: ACM p. 77-88.

V. Puente, et al. ••Adaptive Bubble Router: A Design to Improve Performance in Torus Networks,•• Proceedings of the IEEE 274 International Conference on Parallel Processing, Sep. 1999, pp. 58-67.

R. Rajamony, et al. "PERCS: The IBM POWER7-IH High-Performance Computing System," IBM J. Research and Development, vol. 55, No. 3, article 3, p. 3.1-3.12.

S. Scott and G. Thorson, ••The Cray T3E Network: Adaptive Routing in a High Performance 3D Torus,•• Proceedings of HOT Interconnects IV, Aug. 1996, pp. 147-156, p. 1-10.

Robert S. Sinkovits, et al., "Data Intensive Analysis on the Gordon High Performance Data and Compute System," KDD•11, Aug. 21-24, 2011, San Diego, California, USA, ACM Press, p. 747-748.

\* cited by examiner

T-STAR INTERCONNECTION NETWORK TOPOLOGY

CROSS REFERENCE TO RELATED APPLICATION

This application is a continuation of U.S. application Ser. No. 13/569,789, filed on Aug. 8, 2012, the disclosure of which is incorporated by reference herein in its entirety.

BACKGROUND

The present invention relates to data networks, and more specifically, to an improved topology for nodes in a data network.

An exemplary data network transmits data, such as data in the form of packets, between nodes or users on the network. Each node may perform operations independently or may cooperate to transmit data between nodes in the network. In some cases the nodes include routers and/or switches, where links connect the nodes to one another. The links may be bi-directional, thus allowing data transmission in either direction between the nodes.

Larger data networks may lead to increased latency for communication between nodes that have a long path between a source and destination node. This can be caused by a large number of links the data must traverse to reach the destination node. Further, complex data networks having a large number of nodes and links may also experience faults more frequently. Faults in the network can lead to re-routing of data transmission between nodes, thus, also contributing to increased latency for data transmissions.

SUMMARY

According to one embodiment of the present invention, a method of constructing network communication for a grid of node groups is provided, the grid including an M dimensional grid, each node group including N nodes, wherein M is greater than or equal to one and N is greater than one, wherein each node includes a router. The method includes directly connecting each node in each node group to every other node in the node group via intra-group links and directly connecting each node in each node group of the M dimensional grid to a node in each neighboring node group in the M dimensional grid via inter-group links.

According to one embodiment of the present invention, a method for network communication for a grid of node groups is provided, the grid including an M dimensional grid, each node group including N nodes, wherein M is greater than or equal to one and N is greater than one, intra-group links directly connecting each node in each node group to every other node in the node group, and inter-group links directly connecting, in parallel, each node in each node group to a node in each neighboring node group in the M dimensional grid, the nodes each including a router. The method includes transmitting a packet from a first node in a first location in a first node group to a second node in a second location within the first node group and transmitting the packet from the second node in the second location in the first node group to a third node in a corresponding second location in a second node group.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
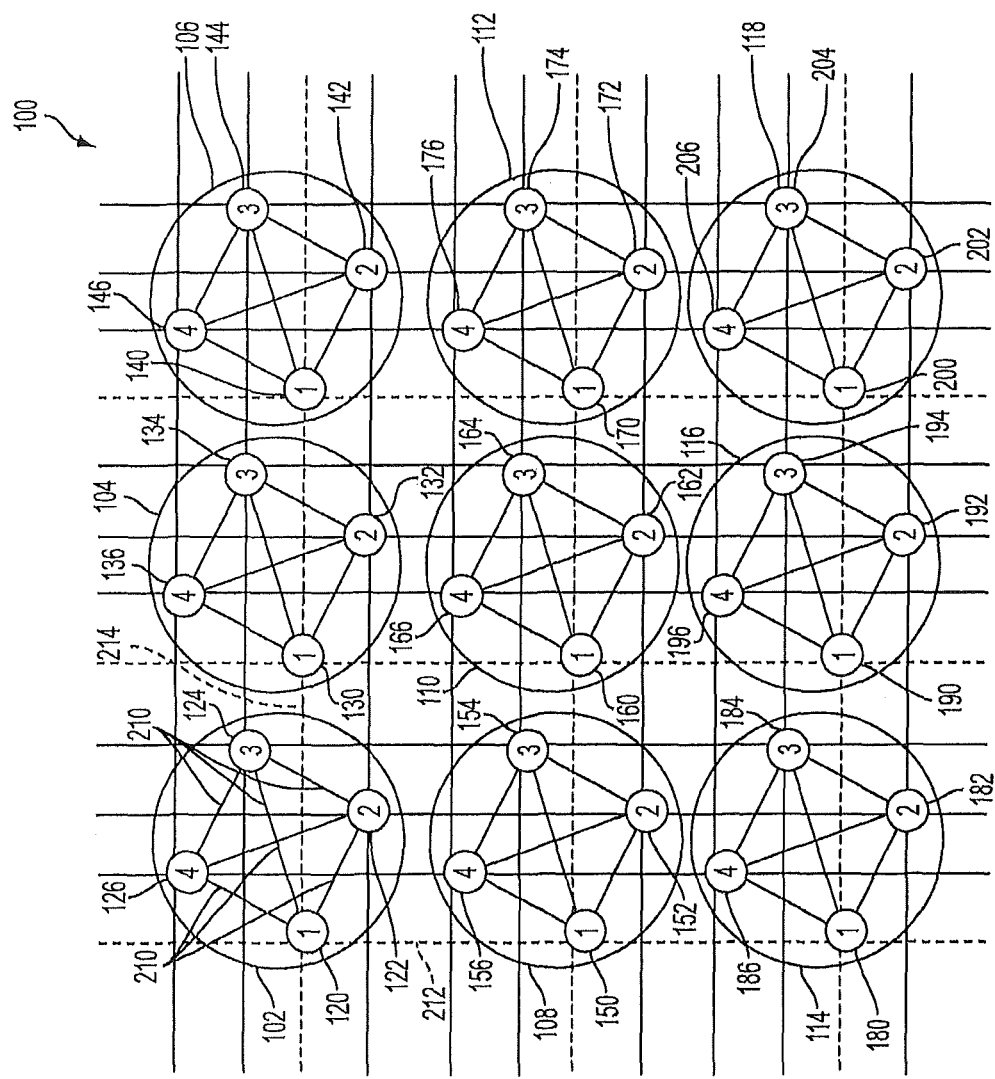
FIG. 1 is a diagram of a portion of an exemplary system for a data network.

Embodiments of a system and method for a network topology, which may be referred to as a T-Star topology, in some embodiments include a grid of node groups organized in a mesh or torus. Each node group includes a plurality of nodes, each node including a router, where an all-to-all node group configuration provides direct connection between each node in each node group by intra-group links. Further, links between nodes in different node groups, called inter-group links, are provided between nodes in neighboring node groups, where the inter-group links are parallel direct connections from each node in each node group to a node in a neighboring node group. The position of the node within each neighboring node group receiving the inter-group link may be the same, thus providing parallel connection from each node to each of the neighboring node groups. The network data system and topology provide reduced latency compared to a standard torus network with the same number nodes for network communication, reduced-length transmission paths as well as deadlock-free routing.

In an embodiment, the node groups are connected via a global multidimensional torus where g denotes the number of nodes in a group and the nodes within the group are labeled i=0, . . . , g–1. Further, M may refer to the dimensionality of the torus, where each node group has a global torus address indicating the coordinate of the group in an M dimensional torus. The dimensions are referred to as 0, 1, . . . M–1 and a node group is identified by its coordinates $(x_0, x_1, \ldots x_{M-1})$. For an example used below, if M=6, the coordinates may be referred to as (a, b, c, d, e, f). Then, in the global torus network embodiment, node i in a group has 2M connections to a node i in the neighboring groups. For example, in a network system utilizing embodiments of the topology with g=6 and M=2, each node in a node group has a direct link to the other (g–1) nodes in the group. Thus, in the example there are 5 such intra-group links from each node and there are 4 inter-group links from each node.

The nodes may each include a router. In some embodiments, the nodes may include a router, a main processor, a memory device and a processing element located in the memory device. The nodes are organized into node groups, where the node groups are organized in a grid, which may be a mesh or torus topology.

In an embodiment where the grid is a torus in every dimension, it wraps so that every node group has 2M neighboring groups. For example, if there are N(A) nodes in dimension A labeled a=0, ..., N(A)-1, then the node group with coordinate (a, b, c, d, e, f) is connected to neighboring node groups as follows. In the described relationship, % denotes a modular operation. In the example, node i in group (a, b, c, d, e, f) is connected to node i in neighboring group ((a+1) % N(A), b, c, d, e, f) and to node i in neighboring group ((a+N(A)-1) % N(A), b, c, d, e, f). In the embodiment, there are similar connections to nodes in node groups in the other dimensions. Examples of neighboring node groups are also discussed below with reference to FIGS. 1-4.

In a mesh embodiment for the network grid, node groups on the edge of the mesh in a dimension have only 1 connection for that dimension. For example, (0, b, c, d, e, f) is connected only to (1, b, c, d, e, f) in the A dimension and (N(A)-1, b, c, d, e, f) is connected only to (N(A)-2, b, c, d, e, f) in the A dimension (N(A)>1). In particular, node i in group (0, b, c, d, e, f) is connected to node i in neighboring group (1, b, c, d, e, f) for the A dimension and node i in neighboring group (N(A)-1, b, c, d, e, f) is connected only to node i in group (N(A)-2, b, c, d, e, f) in the A dimension.

With reference now to FIG. 1, a diagram of a portion of an exemplary system for a data network 100 is shown. The data network 100 is arranged in a grid, where the grid may be a torus or a mesh topology. The data network 100 includes a node group 102, node group 104, node group 106, node group 108, node group 110, node group 112, node group 114, node group 116 and node group 118. The node group 102 includes a node 120 in a first position, node 122 in a second position, node 124 in a third position and node 126 in a fourth position. Similarly, node group 104 includes a node 130 in a first position, node 132 in a second position, node 134 in a third position and node 136 in a fourth position. Other node groups are arranged in similar fashion, where node group 106 includes nodes 140, 142, 144 and 146; node group 108 includes nodes 150, 152, 154 and 156; node group 110 includes nodes 160, 162, 164 and 166; node group 112 includes nodes 170, 172, 174 and 176; node group 114 includes nodes 180, 182, 184 and 186; node group 116 includes nodes 190, 192, 194 and 196; and node group 118 includes nodes 200, 202, 204 and 206. The grid may be any suitable dimension (M dimensional grid) for an application, such as 1, 2, 3, 4, 5, 6, 7 or 8 dimensions in an embodiment. Other embodiments may have 9 or more dimensions. The number of nodes in a node group is greater than one and can vary from two to any number of nodes. Embodiments may include 2, 3, 4, 5, 6, 7, 8, 9, 10 or more (N nodes) for a particular application. As depicted, the grid is a two dimensional grid with four nodes per node group. A pure M dimensional torus can be thought of as having a group size of 1 (g=1).

In an embodiment, each of the nodes in each node group are directly connected to each other in an all-to-all fashion. For example, intra-group links 210 in node group 102 directly connect each node to each other node in the group. Further, inter-group links directly connect each node in each node group to a node in each neighboring node group. For example, node 120 is connected directly to nodes 130 and 150 in neighboring node groups 104 and 108, by inter-group links 212 and 214, respectively. In an embodiment where the data network 100 system is a mesh, node group 102 is a corner group that has neighboring node groups 104 and 108. Further, node group 104 has neighboring node groups 102, 106 and 110. In addition, node group 110 has neighboring node groups 104, 108, 112 and 116. The direct connections provided by the inter-group links are parallel connections, as a node is connected to a single node in each neighboring node group. For instance, inter-group links are provided to connect node 120 to node 150, node 122 to node 152, node 124 to node 154 and node 126 to node 156. In an embodiment, the network provides connections from a node to nodes in the same position within neighboring node groups. For example, node 162 is connected via inter-group links to nodes 152, 132, 172 and 192, where nodes 152, 132, 172 and 192 are all in the second position within their respective groups. Further, the source or originating node (node 162 from the prior example) may also be in the same position (second position). As depicted, the nodes in node group 110 will have direct connections to a selected number of nodes in neighboring node groups, where the selected number equals 2M which is twice the number of dimensions (M) for the grid.

Embodiments may support deterministic routing or a form of dynamic routing in which the next hop between a source node and a destination node is chosen from a set of most efficient or profitable hops, depending on network conditions. In a torus network, virtual channels (VCs) are used to prevent deadlock, e.g., there may be one or more dynamic VCs per direction/link and an appropriate "bubble escape" VC to prevent deadlocks. VCs are known to one of ordinary skill in the art. In an embodiment, each VC represents a buffer inside the network for storing packets. Without proper use of VCs, deadlocks can occur when there is a cycle of full VCs thus preventing packets from moving since there is no available buffer space to store another packet anywhere in the cycle of full VCs. In addition, a "bubble escape" VC is also known to those of ordinary skill in the art. In an embodiment; for each dimension on the torus there is a bubble escape VC and packets require 2 tokens to enter the VC but only 1 token to continue along the same VC, where a token represents buffer space for a full-sized packet. Such VCs may exist for each type of packet traffic. For example, a packet traffic type may be a user-level request, user-level response, user-level acknowledgment, a system-level request, system-level response, or system-level acknowledgment. Accordingly, VCs may be provided and used by each inter-group and intra-group link in a network to prevent network deadlocks.

In an embodiment of the system using dynamic routing, a minimal path, in a network without faults, requires at most one intra-group link, also referred to as "L" hop, and multiple inter-group links, also referred to as "D" hops, to reach its destination. Hops refer to transmission paths between nodes (inter-group and intra-group) for data, such as packets, to enable network communication. For deterministic routing, the L hop may be taken first, on the source node group including the source node, or last, on the destination node group including the destination node. For dynamic routing, we may permit multiple L hops, in any group, to avoid contention on the D inter-group links. So at any node, a packet may make a D hop in an efficient or profitable direction, or an L hop, depending on traffic conditions within the network. To prevent infinite cycles of hops within a group, a limit may be placed on the number of L hops that a packet can make in each group. The number of L hops may be stored in the packet (initially 0) and incremented whenever an L hop is taken. When reaching a programmable limit, L hops are no longer permitted in that group, except on the destination node group in which only the L hop to the final destination node is permitted. When the packet moves to the next group, the L hop counter in the packet is reset to 0. Alternatively, there may be a total limit on the total number of dynamic L hops a packet can make as it traverses the network. To prevent deadlocks, for each type of traffic, there may be 0, 1 or more dynamic VCs per D link and one bubble escape VC per D link. There may also be 0, 1 or more dynamic VCs per L link and one escape VC per L link. When a packet is on a node, it has a unique escape VC such as the bubble escape VC described earlier. If there are more D hops required, the escape VC may be ordered according to some (programmable) dimension order, such as a network with M=6, the order may be A first, then B, then C, then D, then E, then F. For example, with this ordering, if all the A and B hops have been taken but there are still C hops to be taken, then the escape VC is the escape VC on the D link in the (profitable) C direction. When all D hops are completed, and the node is on the destination group, the escape VC is on the L link to the final destination. Alternatively, one could order the links such that the L hop is taken first, followed by dimension-ordered D hops.

In an embodiment using indirect L-routing, a packet may be required to take more than 1 L hop. If indirect L routes are permitted, an extra VC on each L link would be needed, otherwise a cyclic dependency VCs can be created which could result in deadlocks. The indirect route would then have the first hop to be an L hop, then all D hops (if any), followed by a final L hop. There may be a dynamic number of L hops permitted on the intermediate groups. This embodiment has at least 2 VCs per L link (for each type of traffic), and 3 VCs per L link if dynamic hops are permitted.

In an embodiment of the network, one well known approach to those skilled in the art to fault tolerance in a torus network is to set up intermediate destination nodes and route communication through the intermediate node so as to avoid any failed node or link. To avoid deadlocks an extra VC is used for each type of traffic, one for routing from the source node to the intermediate node and then the packet switches to a second VC when going from the intermediate node to the destination node In an embodiment of the network there are g parallel paths between adjacent groups and, if a node fails, that node can be avoided by not permitting any L or D hops into the failed node (or link). In an example, a certain D hop must be taken over a link to the next node. That that next node is failed, or if the link to it is failed, that link and node can be avoided by taking an L hop to a different node in the group followed by a D hop to the next adjacent group.

Several approaches to fault tolerance in the presence of one or more node failures may be implemented. In an embodiment, where links and nodes on the source node group from node id "s" to a node location id "m" are working. There are at least 2 L VCs labeled L1 and L2. The hop from s to m is taken using VC L1. Note that m may be equal to s, in which case no L hop is made. Torus plane m from the source group to the destination group contains no faults. There is 1 D VC, labeled D1, and this is used for routing to the destination group. On the destination group, if m is not equal to the destination node id "d", then VC L2 is used to route from m to the destination node d. Both nodes m and d and the (bidirectional) links between them must be working.

In another embodiment, to permit more flexibility, switching planes on intermediate groups is permitted. Embodiments provide deadlock-free operation for a broad range of node failures. If a node in a node group either fails or must be taken down to replace a faulty node, then the intermediate node routing approach may be used to avoid the faulty board. An intermediate board/group is specified and an extra escape VC for the D links is used (for each traffic type).

In an embodiment with optical connections between node groups, such as a board containing nodes/routers, a "spare" chip is added containing routing logic to the board. Each node in the node group adds a link to the spare. The spares are connected globally in an M dimensional torus. The spare can operate in pass-through mode, in which the bytes of the packet are simply passed from an input to a programmable output. If a D link fails in some direction j on node i, packets for that direction are sent to the spare over the local link, then to the spare on the next board in direction j, then from the spare to node i.

In an application where one of the nodes in each group is a spare, then upon a failure of node f on a board the spare node s becomes logical node f on that board. To prevent also moving the corresponding nodes f on adjacent boards, node f sends its data to the spare node on its board. The spare is operating in pass-through mode, as described above, and sends its data to logical node f (physical node s) on the board with the failed nodes. Provided there are not failed nodes on adjacent boards, and no pass-through path is required than once, the application can be re-configured and run, avoiding the failed node. This provides the appearance of a fault-free partition in which case the other fault-tolerant routing methods earlier need not be invoked.

Figure 2:
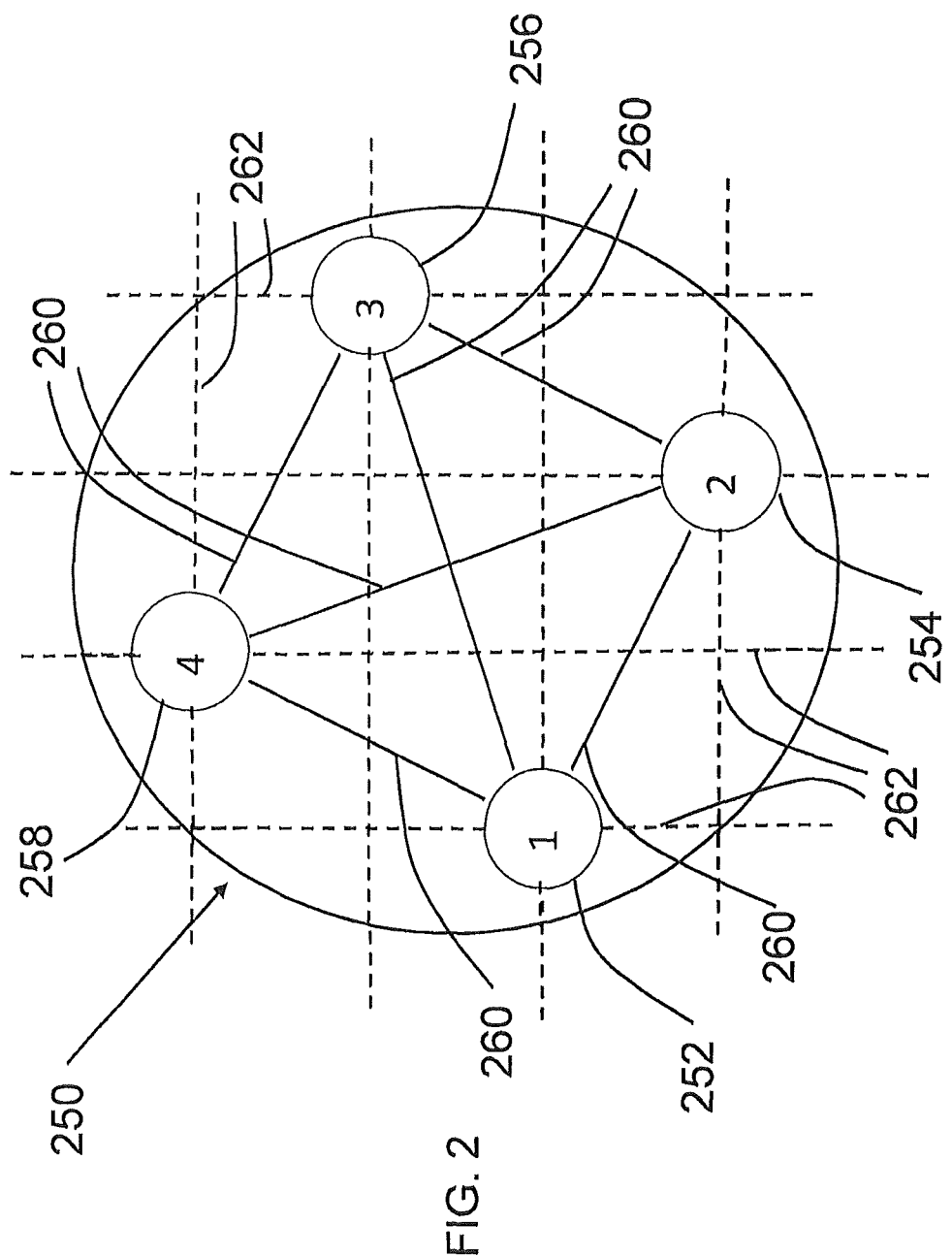
FIG. 2 is a detailed view of an embodiment of a node group, such as node groups that are depicted in FIG. 1.
Figure 3:
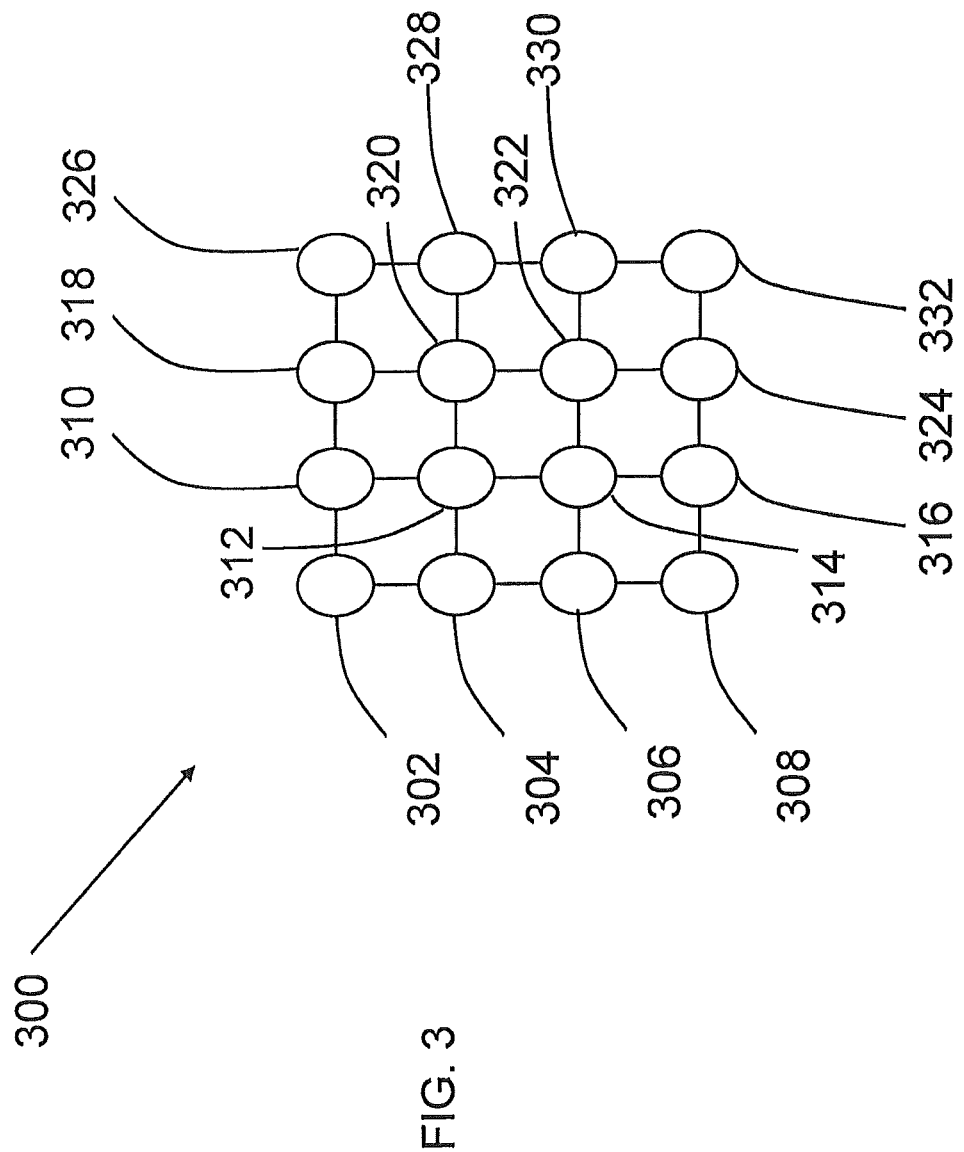
FIG. 3 is a diagram of an embodiment of a mesh network or grid.
Figure 4:
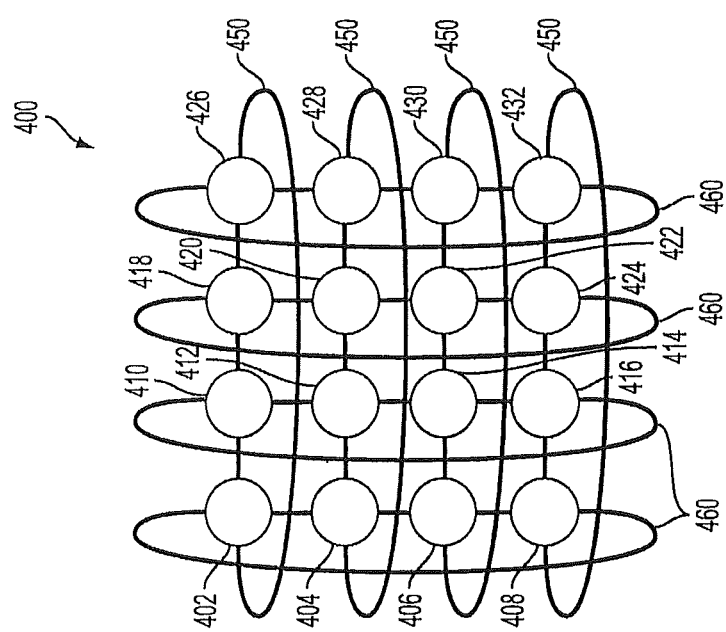
FIG. 4 is a diagram of an embodiment of a torus network or grid.

FIG. 2 is a detailed view of an embodiment of a node group 250, such as node groups that are depicted in FIGS. 1, 3 and 4. The node group 250 includes node 252, node 254, node 256 and node 258. Each of the nodes are directly connected to each other node in the group via intra-group links 260. In addition, each of the nodes in the group are connected in parallel to a node in each neighboring node group in the grid via inter-group links 262.

FIG. 3 is a diagram of an embodiment of a mesh network 300 or grid, where the mesh network 300 is a 2-dimensional network ("M-dimensional grid") of node groups. The node groups in the mesh network 300 may include any suitable number of nodes in any suitable configuration, such as the node group 250 in FIG. 2. As depicted, the mesh network 300 is a 2-dimensional 4×4 network of 16 node groups. Node groups 302, 304, 306 and 308 form a first side edge of the mesh, while node groups 326, 328, 330 and 332 form a second side edge of the mesh network 300. Further, node groups 302, 310, 318 and 326 form a top edge and node groups 308, 316, 324 and 332 form the bottom edge of the mesh network 300. Node groups 312, 314, 320 and 322 are central node groups in the network. In the mesh network 300, nodes in the central node groups have inter-group links to a node in each of four neighboring groups. For example, each node in node group 312 has inter-group links to a node in each of node groups 310, 304, 314 and 320. In the mesh network 300, nodes in edge groups have two or three inter-group links to a node each neighboring group, depending on the node group location in the mesh. For example, node group 302 is a corner node group with two inter-group links for each node to nodes in neighboring groups 304 and 310. In addition, node group 310 is a side node group with three inter-group links for each node to nodes in neighboring groups 302, 318 and 312. Thus, depending on the node group location, the number of links from a node to adjacent node groups is less than or equal to 2 M (e.g., 2×2=4).

FIG. 4 is a diagram of an embodiment of a torus network 400 or grid, where the torus network 400 is a 2-dimensional network of node groups. The node groups in the torus network 400 may include any suitable number of nodes in any suitable configuration, such as the node group 250 in FIG. 2. As depicted, the torus network 400 is a 2-dimensional 4×4 network of 16 node groups. Node groups 402, 404, 406 and 408 form a first side edge of the mesh, while node groups 426, 428, 430 and 432 form a second side edge connected by links 450 to the first side edge of the torus network 400. Further, node groups 402, 410, 418 and 426 form a top edge and node groups 408, 416, 424 and 432 form the bottom edge connected by links 460 to the top edge of the torus network 400.

Node groups 412, 414, 420 and 422 are central node groups in the network. In the torus network 400, each node in each of the node groups have inter-group links to a node in each of four neighboring node groups. For example, each node in node group 412 has inter-group links to a node in each of node groups 410, 404, 414 and 420. Further, node group 402 is a corner node group with four inter-group links for each node to nodes in neighboring groups 404, 408, 426 and 410. In addition, node group 410 is a side node group with four inter-group links for each node to nodes in neighboring groups 402, 418, 416 and 412.

Technical effects of embodiments of a system and method for a network topology are provided that include a grid of node groups organized in a mesh or torus. Each node group includes a plurality of nodes, each node including a router, where an all-to-all network node group configuration provides direct connection between each node in each node group by intra-group links. Further, inter-group links are provided between neighboring node groups, where the inter-group links are parallel direct connections from each node in a node group to a node in a neighboring node group. The network data system and topology provide reduced latency for communication compared to a regular torus, reduced-length transmission paths as well as deadlock-free routing. The intra-group links and inter-group links provide a network with a shortest path between an source node in a first node group and a destination node in a second node group, the shortest path including at most one intra-group link and at least one inter-group link The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of constructing network communication for a grid of node groups, the grid comprising an M dimensional grid, each node group comprising N nodes,
    wherein M is greater than or equal to one, N is greater than one, and each node comprises a router,
    the method comprising:
        directly connecting each node in each node group to every other node in the node group via intra-group links;
        directly connecting, in parallel, each node in a position in each node group of the M dimensional grid to a node in a corresponding same position in each neighboring node group in the M-dimensional grid via inter-group links;
        establishing a corresponding bubble escape virtual channel for each dimension of the M dimensional and a hop number of intra-group links, a hop number of inter-group links;
        establishing a path between a source node of a first node group of the M dimensional grid of node groups and a destination node of a neighboring node group of the M dimensional grid of node groups, the path including at least one of the inter-group links and at least one the intra-group links; and
        utilizing one of the corresponding bubble escape virtual channels in response to the path including more intra-group links than the hop number of intra-group links or more inter-group links than the hop number of inter-group links.

2. The method of claim 1, wherein each node in the first node group comprises:
    a direct parallel inter-group link to a single node in each of a selected number of neighboring node groups of the M dimensional grid,
    wherein the selected number of neighboring node groups is less than or equal to 2 M neighboring node groups.

3. The method of claim 1, wherein each node group comprises a spare node that functions as a pass-through in case of a fault in the M dimensional grid of node groups.

4. A method for network communication for an M-dimensional grid of node groups, each node group comprising N nodes,
    wherein M is greater than or equal to one, N is greater than one, and the nodes each comprising a router,
    the method comprising:
        creating a plurality of intra-group links by directly connecting each node in each node group to every other node in the node group;
        creating a selected number of inter-group links by directly connecting, in parallel, each node in each node group to exactly one node in each neighboring node group, such that the two nodes in each inter-group link each have position i in the respective node group, wherein the selected number of inter-group links is no more than 2M;
        establishing a corresponding bubble escape virtual channel for each dimension of the M dimensional grid, and a hop number of intra-group links, a hop number of inter-group links;
        establishing a path between a source node of a first node group of the M dimensional grid of node groups and a destination node of a neighboring node group of the M dimensional grid of node groups, the path including at least one of the inter-group links and at least one the intra-group links; and utilizing one of the corresponding bubble escape virtual channels in response to the path including more intra-group links than the hop number of intra-group links or more inter-group links than the hop number of inter-group links; and transmitting a packet along the path.

5. The method of claim 4, wherein the first node group comprises:

a direct parallel inter-group link to a single node in each of a selected number of neighboring node groups of the M dimensional grid, wherein the selected number of neighboring node groups comprises less than or equal to 2 M neighboring node groups.

6. The method of claim 4, wherein path comprising an intra-group link from the source node and at least one inter-group link to the destination node.

7. The method of claim 4, wherein path comprising at least one inter-group link from the source node and an intra-group link to the destination node.

8. The method of claim 4, wherein the creating a selected number of intra-group links further comprises directly connecting at least some edges of the M-dimensional grid to respective other edges of the M-dimensional grid to form a torus.

9. The method of claim 4, wherein the creating a selected number of intra-group links further comprises directly connecting at least some edges of the M-dimensional grid to respective other edges of the M-dimensional grid to form a mesh.

10. The method of claim 1, wherein a bubble escape virtual channel, corresponding to the path, is utilized to prevent deadlock on the path between the source node and the destination node.

11. The method of claim 1, wherein each corresponding bubble escape virtual channel requiring at least two tokens for a packet of the path to enter that corresponding bubble escape virtual channel and one token for the packet to continue along that corresponding bubble escape virtual channel.

* * * * *